(12) United States Patent
Wilson et al.

(10) Patent No.: US 10,315,805 B1
(45) Date of Patent: Jun. 11, 2019

(54) DUNNAGE BAG AND LOAD STRAP HANGER APPARATUS AND METHOD

(71) Applicants: John R. Wilson, Sauk Rapids, MN (US); William M. Wilson, Rice, MN (US)

(72) Inventors: John R. Wilson, Sauk Rapids, MN (US); William M. Wilson, Rice, MN (US)

(*) Notice: Subject to any disclaimer, the term of this patent is extended or adjusted under 35 U.S.C. 154(b) by 0 days.

(21) Appl. No.: 15/719,296

(22) Filed: Sep. 28, 2017

Related U.S. Application Data

(60) Continuation-in-part of application No. 15/376,130, filed on Dec. 12, 2016, now Pat. No. 9,783,341, which is a division of application No. 14/918,480, filed on Oct. 20, 2015, now Pat. No. 9,545,872, which is a division of application No. 14/534,164, filed on Nov. 5, 2014, now Pat. No. 9,193,293.

(60) Provisional application No. 61/900,396, filed on Nov. 5, 2013.

(51) Int. Cl.
  *B60P 7/06* (2006.01)
  *B60P 7/135* (2006.01)
  *B65D 33/14* (2006.01)

(52) U.S. Cl.
  CPC .............. *B65D 33/14* (2013.01); *B60P 7/065* (2013.01); *B60P 7/135* (2013.01)

(58) Field of Classification Search
  CPC ........... B60P 7/135; B60P 7/065; B65D 33/14
  USPC .... 410/97, 119, 125, 154, 155, 87; 206/522, 206/593; 428/35.2
  See application file for complete search history.

(56) References Cited

U.S. PATENT DOCUMENTS

| | | |
|---|---|---|
| 1,624,949 A | 4/1927 | Hintz |
| 1,666,213 A | 4/1928 | Leslie |
| 1,705,058 A | 3/1929 | Hintz |
| 1,705,060 A | 3/1929 | Hintz |
| 2,570,368 A | 10/1951 | Moon |
| 2,605,064 A | 7/1952 | Davis |
| 2,753,816 A | 7/1956 | Oakley |
| 3,202,112 A | 8/1965 | Oakley |
| 3,442,402 A | 5/1969 | Baxter |
| 3,890,188 A | 6/1975 | Sams |
| 3,958,516 A | 5/1976 | Cheung |
| 4,083,312 A | 4/1978 | Holman, Jr. |
| 4,145,973 A | 3/1979 | Baxter |
| 4,968,540 A | 11/1990 | Linsenbigler |
| 5,263,801 A | 11/1993 | Keenan et al. |
| 5,431,515 A | 7/1995 | Sansone et al. |

(Continued)

*Primary Examiner* — Stephen T Gordon
(74) *Attorney, Agent, or Firm* — Albert W. Watkins

(57) ABSTRACT

A dunnage bag and load strap hanger apparatus includes a dunnage bag and load strap hanger and a handle mounted applicator block operative to support and affix the dunnage bag and load strap hanger. The dunnage bag and load strap hanger is fabricated from three distinct and separate parts: a generally planar support substrate and two release papers covering adhesive patches or regions on the support substrate. The support substrate in one embodiment is a sheet that is further divided into two contact members separated by a resilient coupler. Each contact member preferably has a contact body, a hanging loop distal to the resilient coupler, and in alternative embodiments an adhesive coating or other fasteners and affixers. In one alternative embodiment there is one affixing surface, and a fastener to couple two contact members together to support a load strap.

15 Claims, 7 Drawing Sheets

(56) References Cited

U.S. PATENT DOCUMENTS

| | | | |
|---|---|---|---|
| 5,487,202 A | 1/1996 | Cowan | |
| 5,502,862 A | 4/1996 | Vosbikian | |
| 5,516,245 A | 5/1996 | Cassidy | |
| 5,784,761 A | 7/1998 | Allen | |
| 5,800,106 A | 9/1998 | Miller | |
| 6,089,802 A | 7/2000 | Bullock | |
| 6,099,221 A | 8/2000 | Takagi | |
| 6,209,768 B1 | 4/2001 | Boaz | |
| 6,220,800 B1 | 4/2001 | Elze et al. | |
| 6,227,779 B1 | 5/2001 | Bullock | |
| 6,253,806 B1 | 7/2001 | Sperry et al. | |
| 6,368,036 B1 * | 4/2002 | Vario | B60P 7/08 410/100 |
| 6,422,794 B1 | 7/2002 | Zhan et al. | |
| 6,585,466 B2 | 7/2003 | Zhan et al. | |
| 6,611,995 B2 | 9/2003 | Brown et al. | |
| 6,758,644 B1 | 7/2004 | Vick | |
| 6,840,391 B2 | 1/2005 | Miller et al. | |
| 7,018,151 B2 | 3/2006 | Bullock | |
| 7,131,805 B1 * | 11/2006 | Morris | B60J 7/102 410/119 |
| 7,260,870 B2 | 8/2007 | Vick | |
| 7,367,765 B2 | 5/2008 | Frett | |
| 7,918,167 B2 | 4/2011 | Tanielian et al. | |
| 7,934,894 B1 | 5/2011 | Temple | |
| 8,485,580 B2 | 7/2013 | Ackerstein Klein | |
| 8,696,273 B1 | 4/2014 | Kanczuzewski et al. | |
| 9,193,293 B2 | 11/2015 | Wilson et al. | |
| 9,545,872 B1 | 1/2017 | Wilson et al. | |
| 9,783,341 B1 | 10/2017 | Wilson et al. | |
| 2004/0040114 A1 | 3/2004 | Takemoto et al. | |

* cited by examiner

DUNNAGE BAG AND LOAD STRAP HANGER APPARATUS AND METHOD

CROSS REFERENCE TO RELATED APPLICATIONS

The present application is a Continuation-In-Part of U.S. patent application Ser. No. 15/376,130 filed Dec. 12, 2016 and co-pending herewith, scheduled to be granted as U.S. Pat. No. 9,783,341 on Oct. 10, 2017, which is a Divisional of U.S. patent application Ser. No. 14/918,480 filed Oct. 20, 2015 and granted as U.S. Pat. No. 9,545,872 on Jan. 17, 2017, which is a Divisional of U.S. patent application Ser. No. 14/534,164 filed Nov. 5, 2014 and granted as U.S. Pat. No. 9,193,293 on Nov. 24, 2015, which in turn claims the benefit under 35 U.S.C. 119(e) of U.S. provisional patent application Ser. No. 61/900,396 filed Nov. 5, 2013, each of like title and inventorship, the entire contents and teachings of each which are incorporated herein by reference.

BACKGROUND OF THE INVENTION

1. Field of the Invention

The present invention pertains generally to apparatus and methods operative to inhibit shifting of a load, and thereby assure the integrity of freight loaded on board a carrier vehicle or container while in transit. More particularly, the present invention pertains to an apparatus for rapidly, safely, and efficiently anchoring a load engaging member to either the load or the load carrier.

2. Description of the Related Art

Very diverse cargo, represented by all types of matter, size, and purpose is being moved about us at a dizzying pace. The logistics of this production and transport is equally as complex and challenging, and has led to the expenditure of billions of dollars developing and implementing several important technologies. Among these are just-in-time (JIT) delivery which can apply to both production and transport; transportation vehicle tracking using Global Positioning System (GPS) locators, cellular tower triangulation, and other position detection apparatus; and even discrete device, package or container tracking and monitoring. In summary, enormous investment has been made in knowing exactly where a particular cargo shipment is physically located during transport.

When effectively executed, these technologies can reduce the need for warehouse space, reduce the likelihood of product spoilage or expiration, and improve inventory turnover, all which are very important in controlling costs, improving reliability of delivery, and increasing manufacturing flexibility. Nevertheless, and as may be apparent, these technologies also rely entirely upon the safe transport of the cargo. A perfectly timed delivery is useless, and can instead be extremely costly, if the cargo itself is damaged or destroyed during transit.

This diverse cargo may be loaded in equally as diverse carrier vehicles or containers. A cargo area might, for exemplary purposes only and not solely limiting thereto, be defined by a cargo container such as a rail car, an airplane cargo hold, a semi trailer, or an intermodal container, each which will be of different size and shape. When filling these cargo containers, the cargo will rarely exactly fit within. In addition, there are many times where the cargo may comprise large, irregular, and relatively unprotected items, or be shipped in a cargo container which may also contain other diverse cargo. Whether due to an inexact fit between the cargo container and cargo, or as a result of irregular cargo, there will almost always be undesirable empty spaces within the cargo container. These empty spaces may in turn may lead to undesirable load shifting of the cargo within the cargo container during transport. Such load shifting, particularly when it occurs suddenly, may lead to substantial damage both to the cargo and to the cargo container.

The risk of harm or damage to the cargo is governed in part by the cargo itself, which can be either fragile or durable; in part by the spaces or voids within the cargo container; and also in part by any additional surroundings or packing that may provide containment of the cargo. In other words, if one object is free to move and collide with another object within a cargo container, this collision certainly increases the risk of harm or damage. Consequently, if the object is well anchored into the cargo container, then there is a lower risk of harm or damage. Alternatively, if an object is surrounded by a soft and cushioning divider, then the risk of harm or damage may be substantially reduced.

Various systems have been devised to anchor cargo within a cargo container. Since in many cases the cargo may vary in dimension, most of these systems provide apparatus that can accommodate the variability. Some exemplary systems provides rails, eyelets, or other anchor points that are firmly affixed into the cargo container. Straps may then be terminated at these anchor points, and wrapped securely about particular items of cargo. Unfortunately, and as may be appreciated, when the cargo is relatively large, as is usually the case, a person securing the load will find it difficult to hold the strap in proper position about the cargo while wrapping the strap thereabout. However, failure to do so may lead to a sag in the strap, even when or after the strap is tensioned. Since the shortest distance between two points is a straight line, this sag means that the strap is not held securely at the shortest length. Subsequent thereto, such as when the cargo container is in transit, this sag or extra length may lead to the strap shifting, which in turn can lead to undesirable load shifting.

While straps work well for some types of loads, in other instances the straps may damage the cargo owing to the small contact area with the load. Particularly where the cargo may comprise large and relatively unprotected items, at least a minimal amount of isolation and protection can be highly beneficial. In other instances, providing secondary securement of the cargo is desired. In such cases, a load divider is preferred, to isolate objects from each other. In addition, filling voids in a cargo container will also help to secure and stabilize cargo. For these and other applications, previous artisans have devised dunnage bags of various sorts that are readily inflated and which can be used for one or more of the aforementioned or other known applications. Dunnage bags are inflatable bags commonly used in the transportation industry to fill empty spaces within a cargo area. They literally provide an air cushion around cargo, and can be inflated to fill up most any void within a cargo container. In the event of a sudden force applied to the cargo container, such as a bump in the road or a rough handling of the cargo container, the dunnage bag will merely compress between adjacent objects, increasing the pressure within the bag and absorbing the energy that would otherwise lead to damaged cargo.

Unfortunately, these dunnage bags are generally quite large and awkward to handle, and even more difficult to place and hold during inflation. Once again, this is especially true where the spaces to be filled and the dunnage bags placed within these spaces are both relatively large. Common cargo containers are commonly much taller than an ordinary person. For exemplary purposes, intermodal containers and semi-trailers will typically range from 8 to 9.5 feet tall, and hicube boxcars have typical internal heights approaching 13 feet. In order to reach these heights and properly place the dunnage bags, workers will typically climb on ladders and attempt to hold the bag and additionally hold an inflation source, all while guiding and placing the bag and while maintaining footing on the ladder. As can be appreciated, this approach is quite dangerous, particularly in cold or wet conditions, and requires many trips up and down the ladder to place the dunnage bags. Furthermore, the worker can only set the ladder on open flooring, meaning he may have to reach over or around the cargo, which can lead to slip and fall injuries. The worker may not even be able to reach into smaller voids, leaving these unprotected. Depending upon how full the cargo container may be, there may not be any open flooring upon which to set the ladder.

Another issue arises with some taller cargo containers such as typical rail cars. OSHA standards require a person who is 6 feet or more above the ground or floor to be tied off before conducting any tasks. Typical rail cars are commonly approximately 13 feet in internal height. This means that an ordinary person will in most cases need to climb above the six foot OSHA threshold in order to be able to reach a hanging location within the rail car. The challenge in the case of placing prior art dunnage bags is that there is no place for a worker to tie off to within most rail cars. This means that the worker is almost certainly in violation of OSHA requirements, creating undesirable legal exposure. Even if there is a place to tie off, the time required to obtain and place the ladder, climb the ladder, tie off, place the dunnage bag, release the safety tie, climb back down the ladder, and then store the ladder is both substantial and an undesirable hindrance.

In the prior art, some artisans have designed hangers and slides or other mechanical apparatus which are semi-permanently or permanently attached. Exemplary U.S. patents, the teachings and contents which are incorporated herein by reference, include: U.S. Pat. No. 3,442,402 by Baxter, entitled "Dunnage service"; U.S. Pat. No. 6,253,806 by Sperry et al, entitled "Inflatable packing material and inflation system"; and U.S. Pat. No. 7,918,167 by Tanielian et al, entitled "Extremely rapid reversible barrier and formation method". While solving some problems, these add substantial cost to the cargo container, limit the flexibility of placement of dunnage bags, and restrict future use of the cargo container. As may be apparent, subdividing a container using dunnage bag curtains or walls is beneficial, but certainly not as flexible in use or application as freely placed bags. Instead, the subdivided cargo space is still subject to the issues of the larger space, namely whether the cargo fits well into the subdivided space and whether there is irregular shaped cargo.

Several other artisans have designed dunnage bags that may be adhesively attached to either the cargo container or load. Exemplary U.S. patents, the teachings and contents which are incorporated herein by reference, include: U.S. Pat. No. 4,145,973 by Baxter, entitled "Dunnage bag with attachment means"; U.S. Pat. No. 5,263,801 by Keenan et al, entitled "Dual bladder airbag"; and U.S. Pat. No. 5,431,515 by Sansone et al, entitled "Dual bladder airbag". To allow these bags to be placed first, and then inflated, adhesive patches or strips provided in these prior art bags are located adjacent to the top of the bag. This allows the bag to be hung limply in an uninflated state from the adhesive area, and then the bag may be inflated to fill the space. Once the bag is inflated, it will typically be securely held in place due to surface contact and friction with surrounding objects and surfaces.

However, this means that the bags must be adhered at or near to the top of the cargo container. Once again, this means the worker will need to reach to near the top of the container, which may for exemplary purposes range from 8 to 13 feet above the floor. This means that this adhesive attachment still suffers from many of the limitations of the prior art, being time consuming and undesirably dangerous. As also noted above, the worker may not even be able to reach into smaller voids, leaving these unprotected.

The teachings and contents of two additional patents are incorporated by reference: U.S. Pat. No. 3,890,188 by Sams, entitled "Label dispensing and applying apparatus"; and U.S. Pat. No. 8,485,580 by Ackerstein Klein, entitled "Apparatus for protecting a child's head". In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a load strap, a dunnage bag, a dunnage bag and load strap hanger, and an application block. The load strap comprises an indeterminate length, elongate, flaccid strap. The dunnage bag and load strap hanger has a support substrate having two generally opposed major surfaces, at least one dunnage bag and load strap hanger contact member, at least one hanging member defined by a second one of the two opposed major surfaces and securely affixed to the at least one contact member, and an affixing surface affixed to the dunnage bag. The application block has a body, handle receiver affixed to the body, a load strap hanger engaging member affixed to the body and adaptive to operatively engage with and retain the at least one hanging loop, and an applicator pad defining at least one surface of the application block body and adapted to operatively engage with and resiliently apply pressure to the at least one dunnage bag and load strap hanger contact member.

In a second manifestation, the invention is a dunnage bag hanger having a generally planar support substrate having two opposed major surfaces. At least two contact members within the generally planar support substrate sheet are flexibly coupled together through a resilient coupler. at least one hanging loop, and an affixing surface. A first one of the at least two contact members has a first contact body defined by a first one of the two opposed major surfaces. A first hanging loop is securely affixed to the first one of the at least two contact members and defines a first hole. An adhesive affixing surface within the first one of the at least two contact members is defined by a second one of the two opposed major surfaces. A first adhesive coating defines at least a portion of the adhesive affixing surface on the second one of the two opposed major surfaces. A release sheet covers the adhesive affixing surface. The resilient coupler further comprises at least two coupling legs defining an opening there between passing entirely through the generally planar support substrate sheet. A second one of the at least two contact members has a second contact body, and a second adhesive coating defining at least a portion of a second affixing surface on the first one of the two opposed major surfaces. The resilient coupler is adapted to fold and thereby allow the at least two contact members to transpose from a first co-planar position to a second adjacent position.

In a third manifestation, the invention is, in combination, a cargo container having a plurality of load strap anchor points, an item of cargo contained within the cargo container, an elongate flaccid load strap configured to extend from a first termination coupled to a first of the plurality of load strap anchor points to a second termination distal to the first termination, the second load strap termination coupled to a second of the plurality of load strap anchor points, and a load strap hanger. The load strap hanger comprises a generally planar support substrate sheet having two opposed major surfaces. At least two contact members within the generally planar support substrate sheet are flexibly coupled together through a resilient coupler. A first one of the at least two contact members has a first contact body defined by a first one of the two opposed major surfaces. An affixing surface is within the first one of the at least two contact members and is defined by a second one of the two opposed major surfaces. An affixer defines at least a portion of the affixing surface on the second one of the two opposed major surfaces that is adapted to affix to at least one of the cargo container and item of cargo. A second one of the at least two contact members has a second contact body. The first and second contact bodies are configured in a first affixed position to contact and retain the load strap therebetween, and configured in a second release position to dislocate from the load strap. The resilient coupler is adapted to fold and thereby allow the at least two contact members to transpose from a first co-planar position to a second adjacent position.

OBJECTS OF THE INVENTION

Exemplary embodiments of the present invention solve inadequacies of the prior art by providing a dunnage bag and load strap hanger and a pole or handle mounted application block. The dunnage bag and load strap hanger may be attached directly and quickly to cargo or cargo containers, and also to dunnage bags and load straps.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a safe ground or floor-level method of affixing a dunnage bag or load strap to cargo or a cargo container. A second object of the invention is to enable the dunnage bag and load strap attachment operation to be carried out quickly and efficiently. Another object of the present invention is to provide an easily manufactured, compactly stored or carried about, and low cost dunnage bag and load strap hanger that consists of a minimum of parts. A further object of the invention is to enable the dunnage bag and load strap hanger to be both disposable and recyclable. Yet another object of the present invention is to provide a dunnage bag and load strap hanger that may be used in all climates reliably and effectively. An additional object of the invention is to allow the application block to easily reach into tight spaces or to high elevations at a distance, quickly and efficiently, and without the need for ladders. A further object of the invention is to provide nominal flexure and conformity in the dunnage bag and load strap hanger and application block, permitting the invention to work effectively even on irregular surfaces.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment dunnage bag hanger apparatus 10, the present invention provides a safe and rapid way to place dunnage bags within a cargo container. A preferred embodiment dunnage bag hanger 20 that may be used as a part of preferred embodiment dunnage bag hanger apparatus 10 is illustrated for exemplary purposes in FIGS. 1 and 2. Dunnage bag hanger 20 is fabricated from three distinct and separate parts: support substrate 22 of generally laminar or sheet configuration; and two release papers 23, 24.

Figure 7:
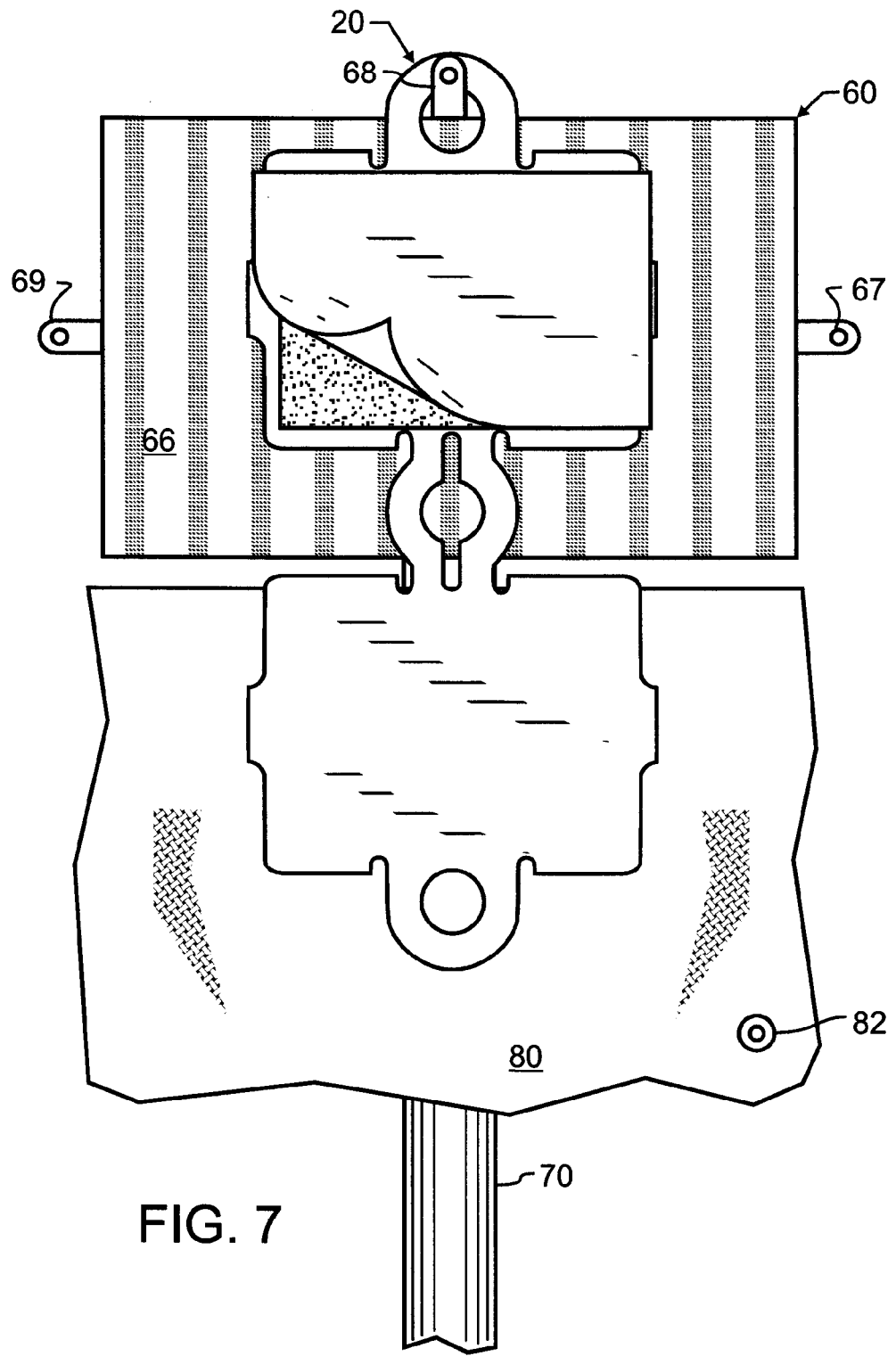
FIG. 7 illustrates a preferred embodiment dunnage bag hanger apparatus affixed to a dunnage bag and including a dunnage bag hanger and handle from top plan view.

Most preferably, support substrate 22 is formed from a sheet of plastic or other resilient material which will offer sufficient structural rigidity and strength to support the anticipated forces required to support a dunnage bag such as dunnage bag 80 illustrated in FIG. 7, while also allowing the smaller legs to flex and bend as required while hanging a dunnage bag. In an exemplary embodiment, the invention may be formed from High Density PolyEthylene (HDPE), polypropylene, or other similar materials that offer excellent flexibility, good temperature tolerance, and ready availability. Various fillers and additives may also be provided as is known in the field of materials science. For exemplary purpose only, and not limiting the present invention solely thereto, fillers such as glass or other fibers may be added to increase strength, crack resistance, and abrasion resistance. Likewise, various additives such as colorants, plasticizers, ultra-violet inhibitors and the like may also be incorporated into the material as desired. While plastics or similar resilient materials are preferred, it will be recognized that there are a plethora of similar materials including metals, resins and plastics, technical ceramics or cementitious materials, and even combinations, laminates or composites of the above. Most importantly, the material used will provide both flexibility and sufficient strength through the entire necessary temperature range to operate and function successfully.

Support substrate 22 defines a pair of contact members 30, 31 that are spaced from each other by a resilient coupler 40. Each of the first and second contact members 30, 31, which may be of any suitable geometry, will preferably have an adhesive coating or layer 38, 39, respectively, applied upon major surfaces of support substrate 22. Preferably, adhesive coating 38 will be applied to contact body 32 upon a first major surface of support substrate 22, while adhesive coating 39 will be applied to contact body 33 upon a second major surface opposed to the first major surface. The adhesive coatings 38, 39 will preferably be designed to engage or affix to a cargo container, to cargo that might be carried within the container, or to a dunnage bag. Preferably, first contact member 30 with adhesive coating 38 may be affixed to one support surface, such as to the cargo or cargo container. A second contact member 31 with adhesive coating 39 may then be affixed to the dunnage bag. As may be apparent, it does not matter which one of first contact member 30 or second contact member 31 is affixed to the dunnage bag, but the other one of first contact member 30 or second contact member 31 will then be affixed to the cargo or cargo container. While an adhesive coating is described, it will be understood that this may take many forms, and that the function is to hold or bind support substrate 22 to cargo, a cargo container, other suitable fixture, or a dunnage bag. Consequently, adhesive coatings 38, 39 may alternatively be any affixing member, including but not limited to mechanical apparatus such as hook-and-loop apparatus, magnetic materials such as polymer-bound magnets, electrostatic apparatus, or chemical apparatus such as two-part materials that fuse, react, vulcanize or otherwise chemically combine or change.

In a most preferred embodiment, adhesive coatings 38, 39 will further be operative through as wide a range of temperatures as may be encountered. For rail cars, cargo containers, and semi trailers, this may range from temperatures well above 120 degrees Fahrenheit to temperatures below minus twenty degrees Fahrenheit. The adhesive may be applied in a liquid form or may be applied as a film or double-sided tape, or may be formed through special chemistry directly within the support substrate material, such as through incomplete vulcanization or the formation of separate layers within the support substrate.

A particularly preferred adhesive coating is formed from tape with suitable adhesive that may further and optionally incorporate reinforcing fibers or strands, though as already described, the invention is not solely limited thereto. In preferred embodiment dunnage bag hanger 20 illustrated in FIGS. 1 and 2, adhesive coatings 38, 39 are preferably be covered by release paper 24, 23, respectively, or other suitable coverings, or the adhesive coatings may otherwise be activated in another way appropriate to installation such as through chemical or thermal activation. Where the adhesive is only appropriate for a single use, such as in the preferred embodiment dunnage bag hanger 20, then dunnage bag hanger 20 will only be used once and then disposed of appropriately.

Figure 1:
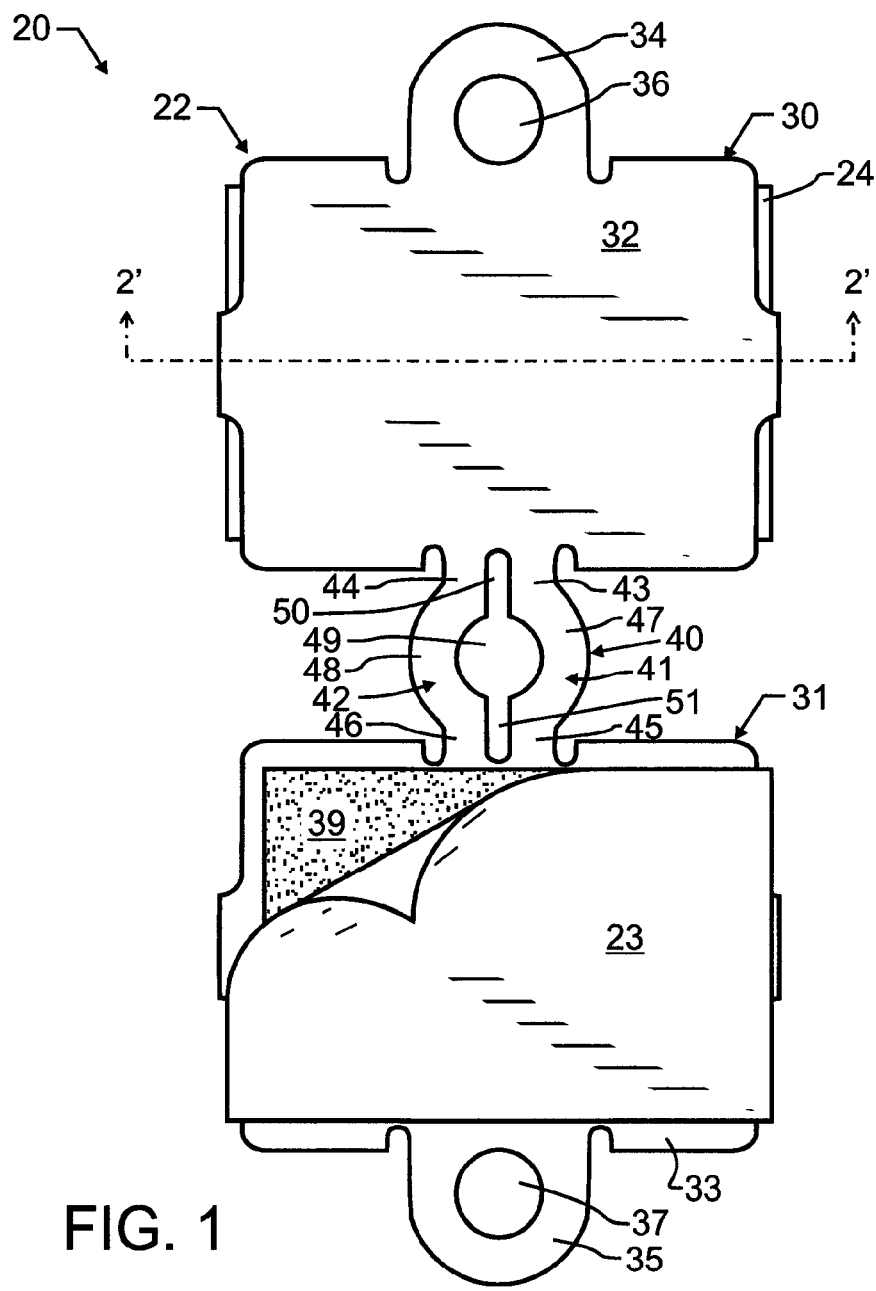
FIG. 1 illustrates a preferred embodiment dunnage bag hanger designed in accord with the teachings of the present invention from top plan view.
Figure 2:
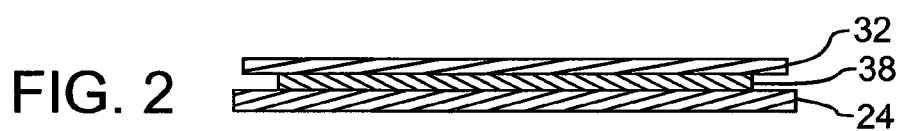
FIG. 2 illustrates the preferred embodiment dunnage bag hanger of FIG. 1 from a side sectional view taken along section line 2' of FIG. 1.

In preferred embodiment dunnage bag hanger 20 illustrated in FIGS. 1 and 2, resilient coupler 40 has a pair of coupling legs 41, 42, each which have a first linear parallel segment 43, 44, respectively, and a second linear parallel segment 45, 46 respectively. The first and second linear parallel segments are separated by respective gentle arcuate sections 47, 48. Coupling legs 41, 42 together define a central coupler opening 49 having a first coupler opening extension 50 and a second coupler opening extension 51. The openings 49-51 together form a generally button-hole shaped opening between coupling legs 41, 42. While other shapes are also contemplated herein in alternative embodiments ranging from simple parallel legs or even a single linear leg, the pair of legs with the geometries as shown permit enormous flexibility in the legs with a desired amount of resilience, and without weakening or harming the support substrate material from which they are formed. Consequently, the geometry of resilient coupler 40 as illustrated is most preferred.

At distal ends of support substrate are hanging loops 34, 35 defining holes 36, 37 respectively. While in the preferred embodiment dunnage bag hanger 20 these loops are formed integrally with support substrate 22, it will be understood that these may be separate components. For exemplary and non-limiting purposes only, these might be formed by affixing separate strands such as twisted or braided wire to support substrate 22.

As described herein above, in use preferred embodiment dunnage bag hanger 20 is applied by applying one of contact members 30, 31 coating to the dunnage bag, and the other one of contact members 30, 31 to the container, cargo or other suitable support. By using a slightly compliant or flexible support substrate material, preferred embodiment dunnage bag hanger 20 may also be applied to non-flat surfaces such as those that gently curve.

Figure 3:
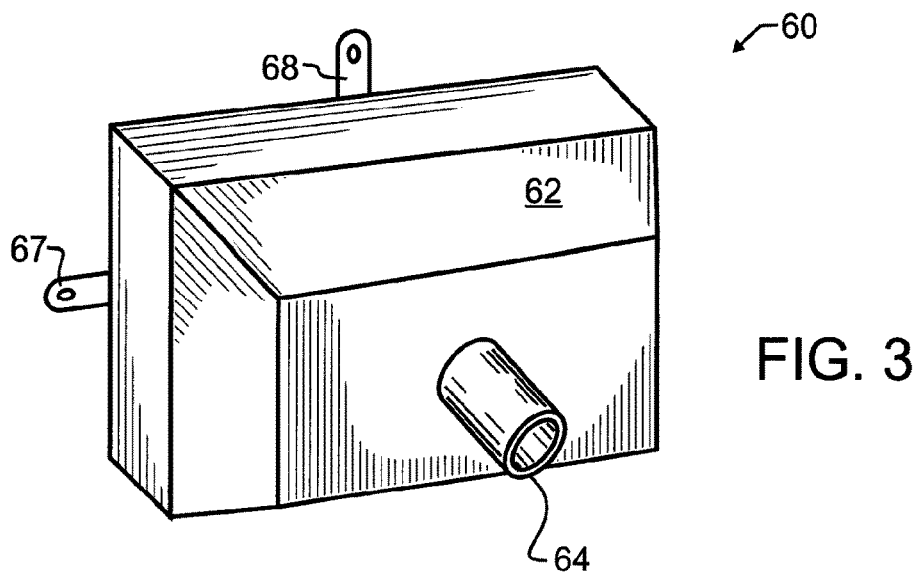
FIGS. 3-5 illustrate a preferred embodiment application block from projected, top and side views, respectively.
Figure 4:
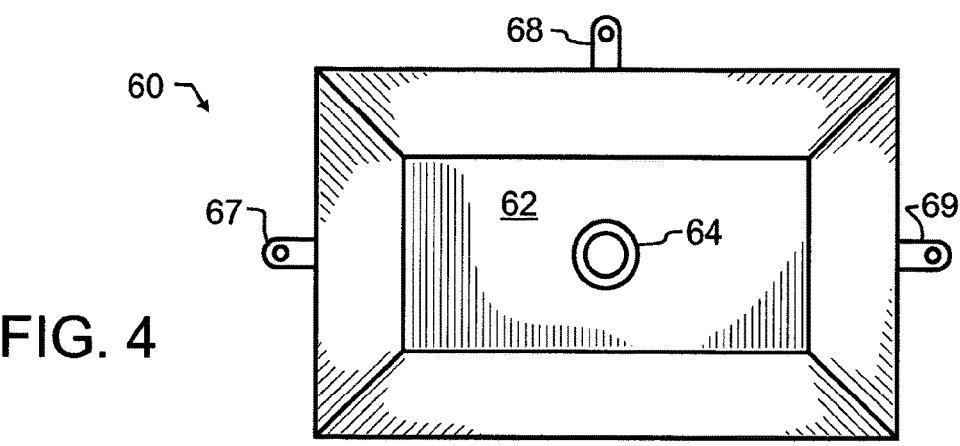
Figure 5:
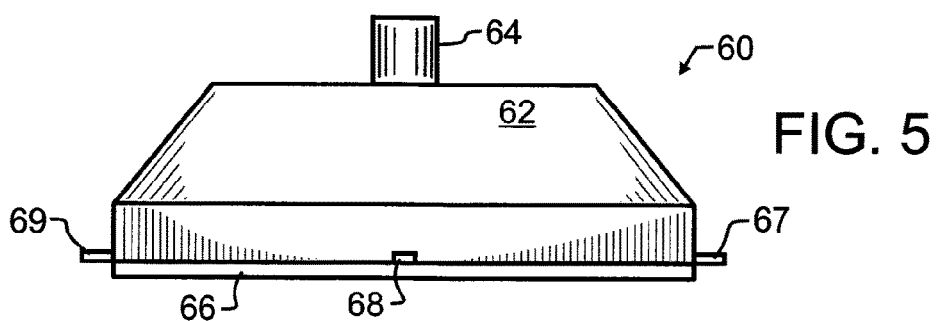

FIGS. 3-5 illustrate a preferred embodiment application block 60 that facilitates the hanging of preferred embodiment dunnage bag hanger 20. Application block 60 includes a body 62 which may be solid or hollow, and which may be fabricated from any suitable material such as but not limited to wood, metal or plastic. A handle receiver 64 such as may be used to receive a threaded broomstick handle 70 or the like is provided to allow application block 60 to be coupled to a suitable prior art handle, such as a broom stick, painting pole, extension arm, or other suitable apparatus. Handle receiver 64 may be threaded, frictionally fit, compressively fit, or otherwise locking as is known in the mechanical arts, and may comprise a male coupling component, female coupling component, or any other type of suitable coupling. Various swivel, locking and adjustable angle couplings may further be provided between handle 70 and application block 60 as desired. A pad 66 of resilient material such as foam or, in the preferred embodiment, carpet forms a work face of application block 60. Pad 66 will preferably deform when pressed against a contact member to ensure even application of forces or pressures upon the contact member, again regardless of whether a mounting surface is even or not.

Most preferably, application block 60 will also have at least one and in the preferred embodiment three hanging hooks 67-69 that are operative with hanging loops 34, 35 of preferred embodiment dunnage bag hanger 20 to allow a person to lift and hang dunnage bag hanger 20. While hanging hooks 67-69 and complimentary hanging loops 34, 35 are exemplary in the preferred embodiment, it will be understood that any apparatus that also reasonably secure and temporary or selectively removable engagement between application block 60 and dunnage bag hanger 20 will be considered to be incorporated herein as an alternative embodiment. For example, and not solely limiting the present invention thereto, various clips, suction devices, magnetic couplers and other apparatus may also be applied hereto.

For the following discussion, it will be presumed that contact member 30 is being affixed to a cargo container, and all references will be to components that form a part of contact member 30. However, it will be understood that the discussion is equally applicable to the equivalent components of contact member 31 and that contact member 31 could instead be attached to a cargo container.

In a first step, a person will remove release paper 23 from contact member 31, and a dunnage bag 80 illustrated in FIG. 7 may then be affixed directly to adhesive 39. The geometry of the hanging hooks 67-69 is not critical, and may take any suitable form. However, in the next step on of these hanging hooks 67-69 will preferably slide through hole 36 and catch hanging loop 34, so that dunnage bag hanger 20 may be lifted and moved about while both hanger 20 and the dunnage bag 80 are suspended from one of hanging hooks 67-69. Most preferably, when dunnage bag hanger 20 is suspended from one of hanging hooks 67-69, the non-adhesive major surface of contact member 30 will be immediately adjacent to pad 66. This exposes adhesive coating 38 when release paper 24 is removed therefrom. Then application block 60 may be raised to a desirable attachment location, and pressure can be applied through the handle, causing pad 66 to press against contact member 30. Once again, by using a material that is slightly flexible in the fabrication of support substrate 22 and by using a slightly flexible or deformable pad 66, the present invention will conform to minor irregularities in a surface and still securely affix thereto. As may be apparent then, a person need only remove one release paper and attach dunnage bag 80, then slide the opposite contact member hanging loop onto handle 70, remove the second release paper, and finally affix dunnage bag hanger 20 into the cargo or cargo container. The dunnage bag 80 may then be inflated through an inflation valve 82 or the like as is known in the art. This is all done at ground level, without the need to retrieve or climb a ladder.

The provision of three hanging hooks 67, 68, 69, each perpendicular to the adjacent hooks, allows application block 60 to be used to not only hang a dunnage bag hanger 20 using hanging hook 68 and holding a pole or handle vertically, referenced here as in the 12 o'clock position. FIG. 7 illustrates dunnage bag hanger 20 suspended from hanging hook 68, viewed from the pad 66 side of application block 60 but without a dunnage back suspended therefrom. Dunnage bag hanger 20 may also be hung using hanging hook 67 and holding a pole or handle horizontally and extending to the operator's right, referenced here as in the 3 o'clock position, or to hang a dunnage bag hanger 20 using hanging hook 69 and holding a pole or handle horizontally and extending to the operator's left, referenced here as in the 9 o'clock position. As may be apparent, at least one hanging hook needs to be provided, but any number may be provided so long as they do not interfere with one passing through a hanging loop 34, 35.

Various embodiments of dunnage bag hanger apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 6:
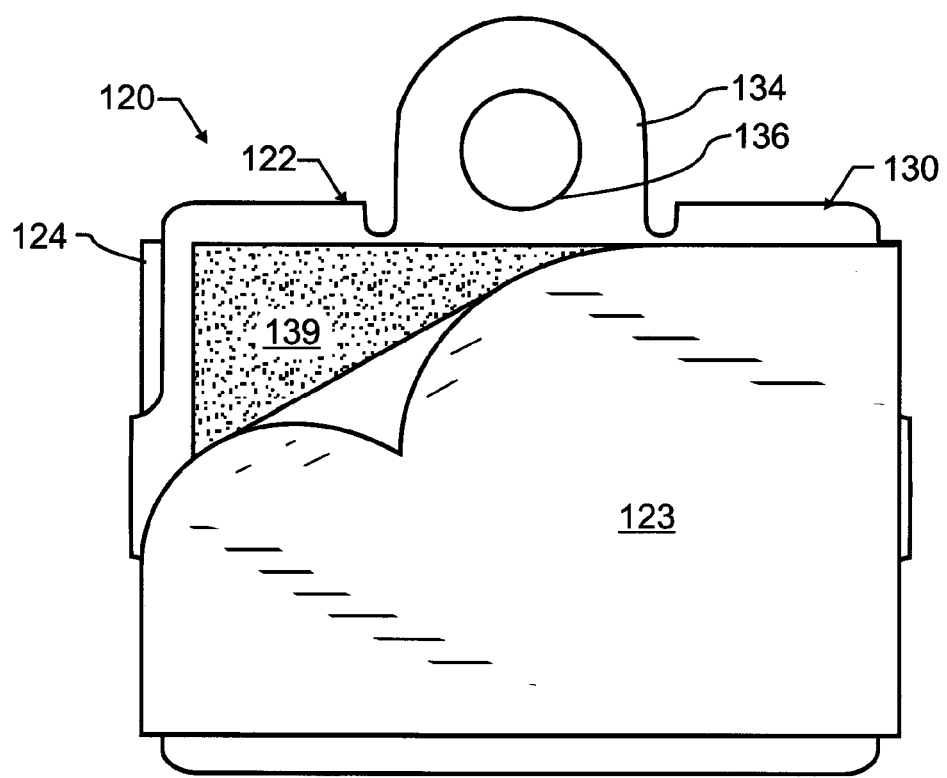
FIG. 6 illustrates a first alternative embodiment dunnage bag hanger from top plan view.

FIG. 6 illustrates an alternative embodiment dunnage bag hanger 120 which has many of the same features as those found in the preferred embodiment. However, rather than having two separate contact members 30, 31 interconnected by resilient legs, a single contact member 130 has adhesive coatings 138, 139 placed on the opposed major surfaces. This hanger 120 is less preferred, since the dunnage bag must flex and move to contact the cargo container surface, regardless of whether the alternative embodiment dunnage bag hanger 120 is applied first to the cargo container or first to the dunnage bag.

As noted herein above, there are many instances where a person may endeavor to affix a load strap about cargo. FIGS. 8-12 illustrate a dunnage bag and load strap hanger that is well suited to this task. As visible in FIG. 8, preferred embodiment dunnage bag and load strap hanger 220 is very similar to dunnage bag hanger 20 of FIG. 1. However, second adhesive coating 239 and release paper 223 have been reduced in dimension to provide an exposed portion of second contact body 233 within second contact member 231. An optional fastener 290 may also be provided. In the instance where fastener 290 comprises an adhesive layer, then a release paper cover 291 may also preferably be provided. When optional fastener 290 is provided, it will also preferably be of dimension similar to second adhesive coating 239 and release paper 223, keeping an exposed portion of first contact body 232 within first contact member 230.

Figure 8:
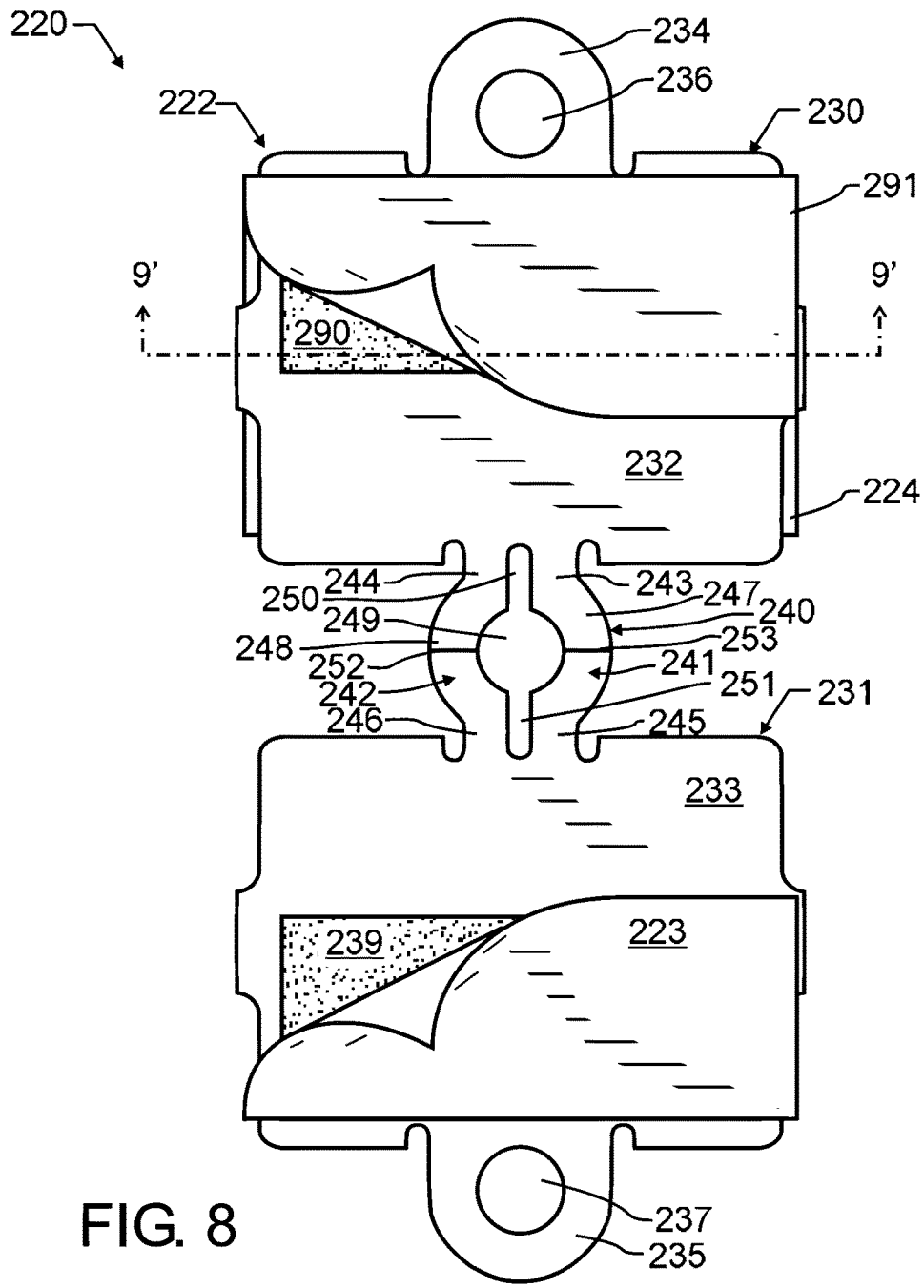
FIG. 8 illustrates a preferred embodiment dunnage bag and load strap hanger from top plan view.
Figure 9:
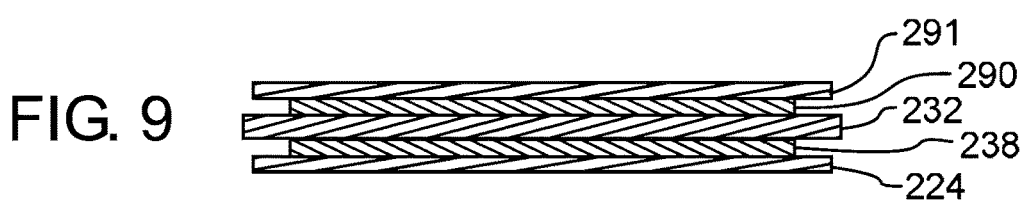
FIG. 9 illustrates the preferred embodiment dunnage bag and load strap hanger of FIG. 8 from a side sectional view taken along section line 9' of FIG. 8.

FIG. 9 illustrates preferred embodiment dunnage bag and load strap hanger 220 from a side sectional view taken along section line 9' of FIG. 8. As may be apparent when contrasted with FIG. 2, first contact body 232 is sandwiched on both sides with adhesive layers 238, 290, and release papers 224, 291.

Figure 10:
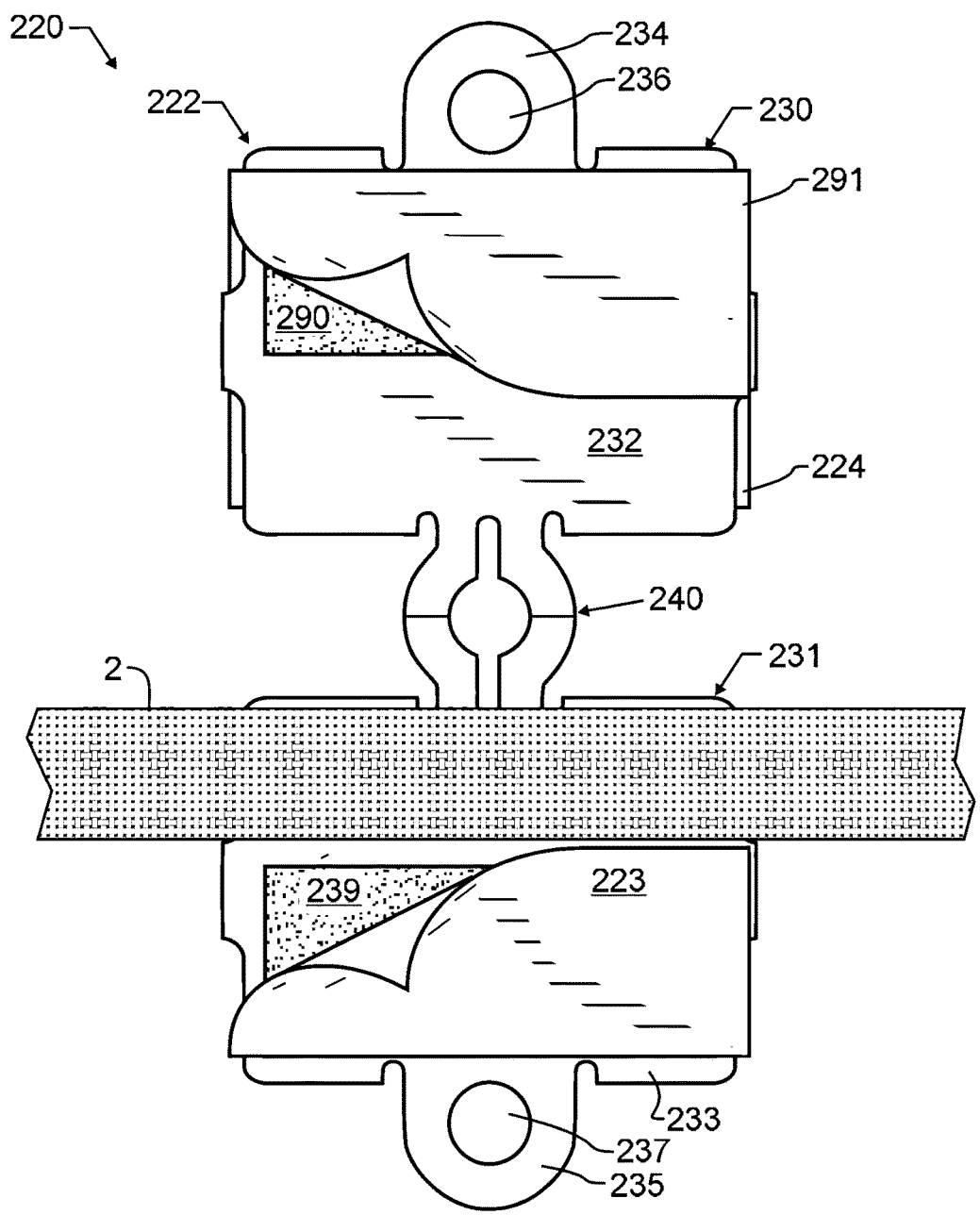
FIG. 10 illustrates the preferred embodiment dunnage bag and load strap hanger of FIG. 8 in combination with an indeterminate length load strap, prior to closure of the preferred embodiment dunnage bag and load strap hanger about the load strap, from top plan view.

This arrangement of exposed portions of first contact body 232 and second contact body 233 permits a prior art load strap 2 to be inserted between. FIG. 10 illustrates the placement of indeterminate length load strap 2 against preferred embodiment dunnage bag and load strap hanger 220, prior to closure of preferred embodiment dunnage bag and load strap hanger 220 about the load strap. Load strap 2 may be placed either adjacent to the exposed portion of first contact body 232 or the exposed portion of second contact body 233. It will be understood that either indeterminate length load strap 2 or preferred embodiment dunnage bag and load strap hanger 220 may be actually moved into juxtaposition with the other, depending upon the circumstance.

Figure 11:
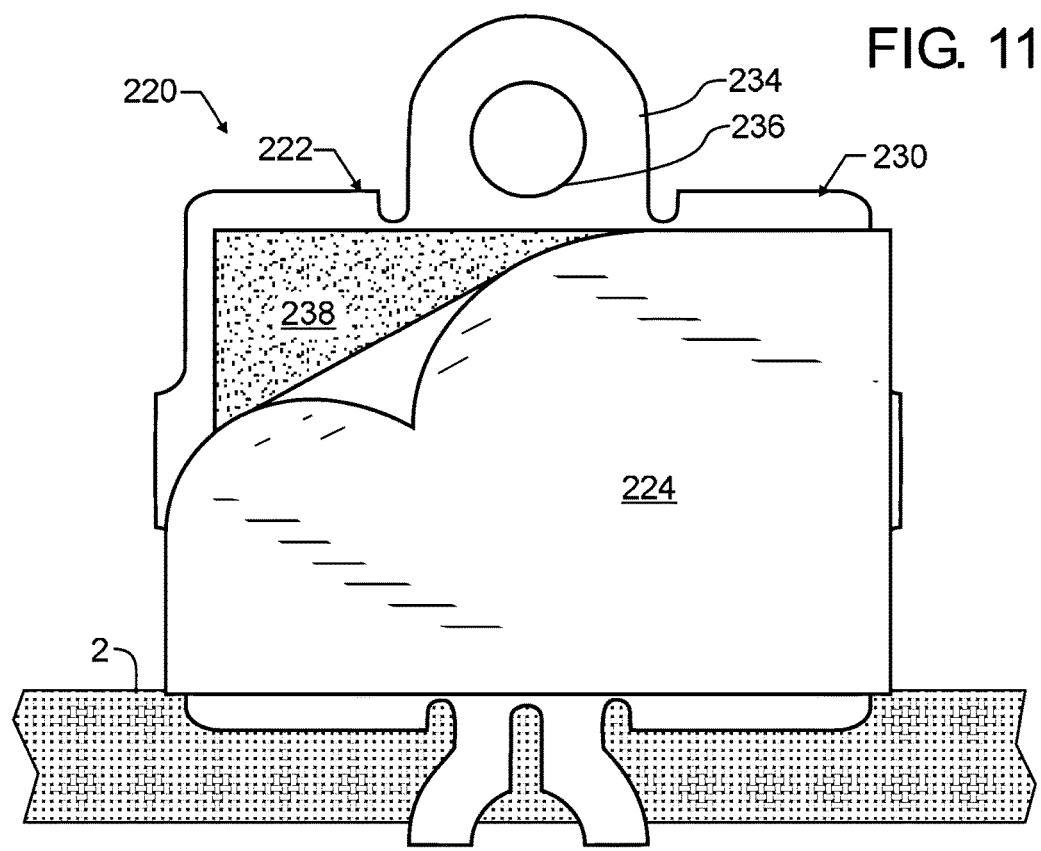
FIG. 11 illustrates the preferred embodiment dunnage bag and load strap hanger of FIG. 8 in combination with an indeterminate length load strap, subsequent to closure of the preferred embodiment dunnage bag and load strap hanger about the load strap, from top plan view.

FIG. 11 illustrates preferred embodiment dunnage bag and load strap hanger 220 in combination with an indeterminate length load strap, subsequent to closure. Closure comprises removal of release papers 223, 291, followed by folding and pivoting of first contact member 230 about resilient coupler 240 along fold lines 252, 253. This moves first contact member 230 out of co-planer relationship with second contact member 231 and into a parallel and adjacent position, allowing second adhesive coating 238 to contact adhesive layer 290. If second adhesive coating 238 and adhesive layer 290 comprise a contact cement, then upon contact these two adhesives will bond together, fastening first contact member 230 in this co-planer relationship with second contact member 231. As may be appreciated from FIGS. 10 and 11, in this closed position of FIG. 11 load strap 2 may slide along the load strap longitudinal axis unrestricted. This allows preferred embodiment dunnage bag and load strap hanger 220 to be moved to a suitable position along load strap 2 prior to being adhered through first adhesive coating 238 to a support, and also allows load strap 2 to be tensioned without needing to move an already adhered dunnage bag and load strap hanger 220.

While a contact adhesive comprising second adhesive coating 238 and adhesive layer 290 has been described for preferred embodiment dunnage bag and load strap hanger 220, it will be appreciated that any suitable fastener may be provided to fasten first contact member 230 in co-planer relationship with second contact member 231. Consequently, in one alternative embodiment a hook and loop fasteners such as sold commercially under the trademark VELCRO (hook and loop type fastener) may be substituted, for exemplary but non-limiting example substituting the hook layer for second adhesive coating 238 and the loop layer for adhesive layer 290. By doing so, preferred embodiment dunnage bag and load strap hanger 220 may be opened and closed repeatedly at will. There are many other suitable fasteners and closures that may also be substituted, including but not limited to snaps, buttons, magnets, and other well-known apparatus. In another alternative embodiment, as noted herein above one or the other of second adhesive coating 238 and adhesive layer 290 may be omitted, and a single adhesive layer or coating used.

In a further alternative embodiment, the fasteners are formed integrally with and from support substrate 222. In this alternative embodiment, the support substrate material may be pressed or drawn, for exemplary and non-limiting purpose by vacuum thermo-forming, blow-molding, or other heat or pressure technique. Mating dimples, hole and "button" or "push pin, or other features are then formed, such that when the features formed in first contact body 232 are pressed into features formed in second contact body 233, the two interlock sufficiently to fasten or hold the two contact bodies together. The forces holding the two contact bodies together are desirably low enough to allow or permit later manual separation, but are preferably great enough to adequately support a load strap or dunnage bag during the placement and installation process.

Figure 12:
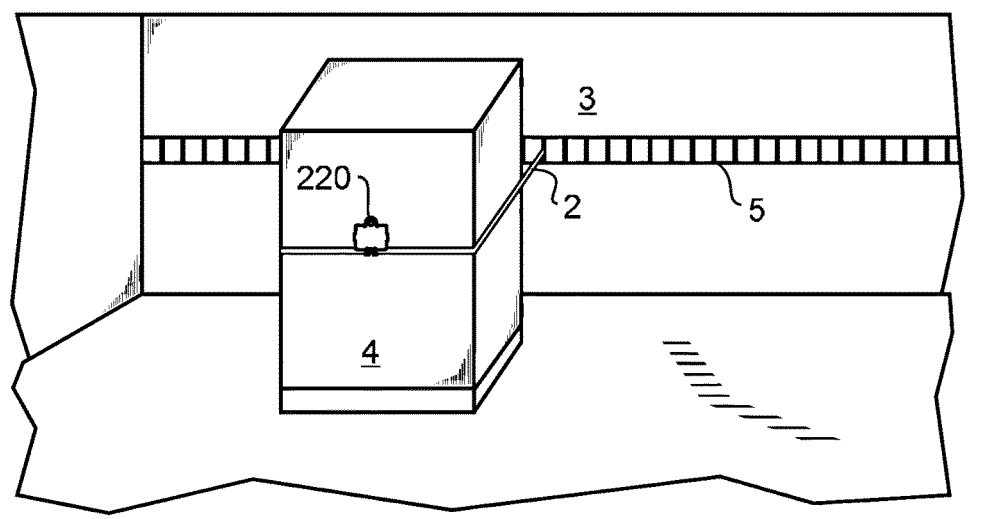
FIG. 12 illustrates the combination preferred embodiment dunnage bag and load strap hanger and load strap of FIG. 11 in further combination with a cargo container and cargo, from an isometric and partial view.

FIG. 12 illustrates preferred embodiment dunnage bag and load strap hanger 220 in further combination with load strap 2, a cargo container 3, and cargo 4. Rails 5 are illustrated to provide anchor points for load strap 2, but it will be understood that eyelets or any other known and suitable anchor points may be provided. As may be appreciated, preferred embodiment dunnage bag and load strap hanger 220 and load strap 2 may then be affixed for exemplary purposes directly on a side of cargo 4 at an elevation corresponding to rail 5. This may be done either before or after a first end of load strap 2 is secured to rail 5. Finally, the second end of load strap 2 will be secured to rail 5, in a manner to simultaneously tension load strap 2 about cargo 4. Also as may be appreciated, more than one preferred embodiment dunnage bag and load strap hanger 220 may be provided in conjunction with a single load strap 2 to guide the load strap in an intended path. However, in such instance an installer must take care to ensure that the plurality of dunnage bag and load strap hangers 220 are actually in line with each other. There is, nevertheless, some alignment tolerance provided by having a larger area exposed on first and second contact bodies 232, 233 than the width of the load strap.

It should be appreciated that preferred embodiment dunnage bag and load strap hanger 220 may be used not only to hold a load strap in proper position prior to tensioning, but also to pre-position a dunnage bag. Again, a comparison of FIGS. 2 and 8 reveals that all of the components useful or essential for application to dunnage bag 80 have been provided in preferred embodiment dunnage bag and load strap hanger 220.

From the foregoing figures and description, several additional features and options become more apparent. First of all, as noted herein above, the preferred or alternative embodiment dunnage bag hangers and application block may be manufactured from a variety of materials. The specific material used may vary, though it is preferable that all materials are sufficiently tough and durable to not fracture, even when significant forces are applied thereto. Furthermore, where dunnage bag hangers 20, 120, 220 are disposable, it will be understood that the materials may be selected to enable recycling, such as but not limited to the use of HDPE and polypropylene described herein above.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a load strap, a dunnage bag and load strap hanger, and an application block,
    said load strap comprising an indeterminate length, elongate, flaccid strap;
    said dunnage bag and load strap hanger comprising:
        a support substrate having a first configuration defining first and second opposed major surfaces,
            first and second dunnage bag and load strap hanger contact members within said support substrate flexibly coupled together through a resilient coupler and defined by a first one of said two opposed major surfaces,
        a fastener on said first one of said two opposed major surfaces in said first configuration configured to selectively adhere with a dunnage bag;
        a non-adhesive strap contact region within said first one of said two opposed major surfaces;
        said support substrate having a second configuration folded within said resilient coupler so that said first and second dunnage bag and load strap hanger contact members face each other; and
        said fastener securing said first dunnage bag and load strap hanger contact member to said second dunnage bag and load strap hanger contact member in said second configuration with said non-adhesive strap contact region in contact with said load strap;
        at least one hanging member securely affixed to at least one of said contact members; and an affixing surface defined by a second one of said two opposed major surfaces;

said application block comprising:
a body;
a handle receiver affixed to said body;
a load strap hanger engaging member affixed to said body and adapted to operatively engage with and retain said at least one hanging member; and
an applicator pad defining at least one surface of said application block body and adapted to operatively engage with and resiliently apply pressure to said at least one dunnage bag and load strap hanger contact member.

2. The combination load strap, dunnage bag and load strap hanger, and application block of claim 1, wherein said support substrate in said first configuration further comprises a generally planar sheet.

3. The combination load strap, dunnage bag and load strap hanger, and application block of claim 1, wherein said at least one hanging member further comprises a loop having an open center.

4. The combination load strap, dunnage bag and load strap hanger, and application block of claim 1, further comprising a release sheet covering said affixing surface.

5. The combination load strap, dunnage bag and load strap hanger, and application block of claim 1, wherein said hanging member further comprises a hook protruding from said body.

6. The combination load strap, dunnage bag and load strap hanger, and application block of claim 1, wherein said dunnage bag and load strap hanger support substrate further comprises:
said first one of said first and second contact members having a first contact body, a first hanging loop defining a first hole, and a first adhesive coating defining said affixing surface on said second one of said two opposed major surfaces.

7. The combination load strap, dunnage bag and load strap hanger, and application block of claim 6, wherein said dunnage bag and load strap hanger support substrate further comprises a second one of said first and second contact members having a second contact body, a second hanging loop defining a second hole, and a second adhesive coating defining a second affixing surface on said first one of said two opposed major surfaces.

8. The combination load strap, dunnage bag and load strap hanger, and application block of claim 7, wherein said resilient coupler further comprises at least two coupling legs defining an opening therebetween passing entirely through said support substrate.

9. The combination load strap, dunnage bag and load strap hanger, and application block of claim 8, wherein each one of said at least two coupling legs further comprises a pair of linear parallel segments coupled to each other by an arcuate section.

10. The combination load strap, dunnage bag and load strap hanger, and application block of claim 9, wherein said arcuate sections of said at least two coupling legs together define said opening which is a generally round central coupler opening.

11. The combination load strap, dunnage bag and load strap hanger, and application block of claim 1, wherein said fastener comprises an adhesive.

12. The combination load strap, dunnage bag and load strap hanger, and application block of claim 4, wherein said affixing surface comprises an adhesive.

13. The combination load strap, dunnage bag and load strap hanger, and application block of claim 7, wherein said fastener and said second adhesive coating each comprise contact cement.

14. The combination load strap, dunnage bag and load strap hanger, and application block of claim 1, wherein said non-adhesive strap contact region is located on said support substrate first one of said two opposed major surfaces between said fastener and an adhesive coating when said support substrate is in said first configuration.

15. The combination load strap, dunnage bag and load strap hanger, and application block of claim 13, wherein said non-adhesive strap contact region comprises an exposed portion of said support substrate.

\* \* \* \* \*